(12) United States Patent
Kamei et al.

(10) Patent No.: US 9,004,468 B2
(45) Date of Patent: Apr. 14, 2015

(54) TORQUE ROD

(75) Inventors: Naoyuki Kamei, Yokohama (JP); Mutsuo Tezuka, Haga-gun (JP)

(73) Assignees: Bridgestone Corporation, Tokyo (JP); Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 13/985,785

(22) PCT Filed: Mar. 22, 2012

(86) PCT No.: PCT/JP2012/057382
§ 371 (c)(1),
(2), (4) Date: Aug. 15, 2013

(87) PCT Pub. No.: WO2012/128328
PCT Pub. Date: Sep. 27, 2012

(65) Prior Publication Data
US 2013/0320181 A1 Dec. 5, 2013

(30) Foreign Application Priority Data
Mar. 22, 2011 (JP) .................................. 2011-062663

(51) Int. Cl.
*F16F 9/00* (2006.01)
*B60K 5/12* (2006.01)
*F16F 1/38* (2006.01)

(52) U.S. Cl.
CPC ............. *B60K 5/1275* (2013.01); *B60K 5/1241* (2013.01); *F16F 1/3849* (2013.01)

(58) Field of Classification Search
USPC ................... 188/140.11–141.7, 276; 248/548
See application file for complete search history.

(56) References Cited

U.S. PATENT DOCUMENTS

2005/0212188 A1* 9/2005 Endo .......................... 267/141.2
2007/0018367 A1* 1/2007 Kamei ....................... 267/140.12
(Continued)

FOREIGN PATENT DOCUMENTS

CN 1810534 A 8/2006
CN 1845833 A 10/2006
(Continued)

OTHER PUBLICATIONS

Chinese Office Action, dated Jul. 31, 2014, issued in corresponding Chinese Patent Application No. 201280007032.3.
(Continued)

*Primary Examiner* — Christopher Schwartz
(74) *Attorney, Agent, or Firm* — Sughrue Mion, PLLC (57) ABSTRACT

It is an object of the present invention to ensure that a torque rod breaks downward when a predetermined load or greater is input thereto. A torque rod has a first annular portion (21), a second annular portion (22), a connecting stay portion (24) that interconnects the first annular portion (21) and the second annular portion (22), a first attachment member (31) that is connected via a first rubber elastic body (41) inside the first annular portion (21), and a second attachment member (32) that is connected via a second rubber elastic body (42) inside the second annular portion (22). The connecting stay portion (24) has an upper fork portion (24U) and a lower fork portion (24L), and the bending strength of the lower fork portion (24L) is less than that of the upper fork portion (24U). A cavity portion (30) to which part of the first annular portion (21) is exposed is formed between the upper fork portion (24U) and the lower fork portion (24L). A thin-walled portion (21A) having a projecting portion (21B) is disposed in a region of the first annular portion (21) exposed to the cavity portion (30). A sloping surface (24A) whose lower side slopes toward the second annular portion (22) is formed in a region of the cavity portion (30) opposing the first annular portion (21).

6 Claims, 5 Drawing Sheets

(56) References Cited

U.S. PATENT DOCUMENTS

| | | | |
|---|---|---|---|
| 2008/0315473 A1* | 12/2008 | Nishimae et al. | 267/140.11 |
| 2012/0112395 A1* | 5/2012 | Mizobe | 267/139 |
| 2013/0168907 A1* | 7/2013 | Mizobe et al. | 267/141 |
| 2014/0151946 A1* | 6/2014 | Yokawa et al. | 267/292 |

FOREIGN PATENT DOCUMENTS

| | | |
|---|---|---|
| EP | 1 666 296 A1 | 6/2006 |
| JP | 2005-083412 A | 3/2005 |
| JP | 2006-112537 A | 4/2006 |
| JP | 2006-205905 A | 8/2006 |
| JP | 2007-069742 A | 3/2007 |

OTHER PUBLICATIONS

Extended European Search Report, dated Aug. 18, 2014, issued in corresponding European Patent Application No. 12761261.2.

International Search Report for PCT/JP2012/057382 dated Jun. 19, 2012.

* cited by examiner

TORQUE ROD

CROSS REFERENCE TO RELATED APPLICATIONS

This application is a National Stage of International Application No. PCT/JP2012/057382 filed Mar. 22, 2012, claiming priority based on Japanese Patent Application No. 2011-062663, filed Mar. 22, 2011, the contents of all of which are incorporated herein by reference in their entirety.

TECHNICAL FIELD

The present invention pertains to a torque rod, and particularly relates to a torque rod that is a type of mount configuring an anti-vibration support mechanism for a power unit with respect to a vehicle body and to which mainly torque reaction force and so forth spreading from the power unit to the vehicle body is input as an applied load.

BACKGROUND ART

There has been disclosed a torque rod where a projecting portion configured to be convex toward an outer peripheral side is formed on an outer peripheral surface of a rubber elastic body and where a concave notch portion into which the projecting portion is inserted is formed in the vicinity of a joint portion where an inner peripheral surface of a second annular portion joins to a connecting stay portion (see patent document 1).

Patent Document 1: JP-A No. 2006-112537

SUMMARY OF INVENTION

Technical Problem

Extremely high safety is demanded of vehicles at the time of a frontal collision or an offset collision, and as a structure that enhances such safety at the time of a collision on the vehicle front side, for example, a structure has been developed which allows the power unit to fall out downward (toward the road surface) from inside the engine compartment because of a large impactive load when the vehicle experiences a collision. Because of this, the power unit and structures around the power unit can be effectively prevented from moving inward of the vehicle at the time of a vehicle collision.

In order to realize this power unit fall-out structure, it is conceivable, for example, to intentionally form a stress concentration portion in the section of the torque rod that connects the power unit to the vehicle body, so that, because of a large impactive load at the time of a vehicle collision, deformation or destruction starting at the stress concentration portion arises in a predetermined direction in which the power unit is to be allowed to fall out.

However, in the conventional example described above, there is the potential for such a configuration to also end up affecting strength with respect to twisting force and up-and-down vibration at the time of vehicle travel for which high strength is demanded, and there is needed a technology that will allow the power unit to reliably fall out downward only with respect to an impactive input in the front-and-rear direction caused by a vehicle collision.

In consideration of the above circumstances, it is an object of the present invention to ensure that a torque rod can be more reliably broken downward when a predetermined load or greater is input thereto, and that a power unit can be allowed to fall out downward.

Solution to Problem

A first aspect of the present invention is a torque rod comprising: a first annular portion; a second annular portion; a connecting stay portion that extends outward in a radial direction from an outer peripheral section of the second annular portion and is continuous with an outer peripheral section of the first annular portion, the connecting stay portion having an upper fork portion that is connected to an upper side of the first annular portion and a lower fork portion that is connected to a lower side of the first annular portion and whose bending strength is less than that of the upper fork portion, with a cavity portion to which part of the first annular portion is exposed being formed between the upper fork portion and the lower fork portion; a first attachment member that is placed on an inner peripheral side of the first annular portion and is connected to a power unit; a second attachment member that is placed on an inner peripheral side of the second annular portion and is connected to a vehicle body; a first rubber elastic body that is disposed between the first annular portion and the first attachment member and elastically interconnects the first annular portion and the first attachment member; a second rubber elastic body that is disposed between the second annular portion and the second attachment member and elastically interconnects the second annular portion and the second attachment member; a thin-walled portion that is disposed in a region of the first annular portion exposed to the cavity portion; a projecting portion that is disposed on the thin-walled portion and is formed convexly in an axial direction of the first annular portion; and a sloping surface that is formed in a region of the cavity portion opposing the first annular portion and whose lower side slopes toward the second annular portion.

In the torque rod pertaining to the first aspect, the thin-walled portion is disposed in the region of the first annular portion exposed to the cavity portion between the upper fork portion and the lower fork portion of the connecting stay portion, and the projecting portion formed convexly in the axial direction of the first annular portion is disposed on the thin-walled portion, so when, at the time of a vehicle collision, a predetermined load or greater has been input from the power unit to the first attachment member and has been further transmitted from the first attachment member to the first annular portion, it becomes easier for stress concentration to arise in the thin-walled portion of the first annular portion having the projecting portion. Because of this, the first annular portion breaks starting at the thin-walled portion, whereby the first attachment member becomes movable backward into the cavity portion.

In addition to this, the connecting stay portion has the upper fork portion that is connected to the upper side of the first annular portion and the lower fork portion that is connected to the lower side of the first annular portion, and the bending strength of the lower fork portion is less than that of the upper fork portion, so the lower fork portion breaks when the predetermined load or greater is input to the first attachment member.

Moreover, the sloping surface whose lower side slopes toward the second annular portion is formed in the region of the cavity portion opposing the first annular portion, so the first attachment member that has moved backward into the cavity portion and has come into contact with the sloping surface is guided on the sloping surface and moves downward. The power unit is connected to the first attachment member, and the power unit can be allowed to fall out downward more reliably as a result of the first attachment member moving downward.

A second aspect of the present invention is the torque rod pertaining to the first aspect, wherein the upper fork portion is reinforced by ribs.

In the torque rod pertaining to the second aspect, the upper fork portion is reinforced by the ribs, and the bending strength of the lower fork portion is configured to be relatively even lower, so the lower fork portion can be allowed to break more reliably when the predetermined load or greater is input to the first attachment member.

A third aspect of the present invention is the torque rod according to the first aspect or the second aspect, wherein the projecting portion is disposed in a position intersecting a direction in which a load is input to the first attachment member.

In the torque rod pertaining to the third aspect, when the predetermined load or greater is input to the first attachment member, the load is concentratedly input to the projecting portion of the thin-walled portion of the first annular portion. Because of this, a larger stress concentration arises in the thin-walled portion of the first annular portion. For this reason, the thin-walled portion can be allowed to break more reliably.

A fourth aspect of the present invention is the torque rod pertaining to the third aspect, wherein a protruding portion that protrudes in such a way as to approach the projecting portion is disposed in a position on the first attachment member opposing the projecting portion.

In the torque rod pertaining to the fourth aspect, when the predetermined load or greater is input to the first attachment member, the protruding portion of the first attachment member quickly contacts the projecting portion of the first annular portion, and the load is transmitted. For this reason, the thin-walled portion can be allowed to break more reliably.

Advantageous Effects of Invention

As described above, according to the torque rod pertaining to the first aspect, there is obtained the superior effect that it can be ensured that the torque rod breaks downward more reliably when the predetermined load or greater is input thereto, and that a power unit falls out downward.

According to the torque rod pertaining to the second aspect, there is obtained the superior effect that the lower fork portion can be allowed to break more reliably.

According to the torque rod pertaining to the third aspect, there is obtained the superior effect that the thin-walled portion can be allowed to break more reliably.

According to the torque rod pertaining to the fourth aspect, there is obtained the superior effect that the thin-walled portion can be allowed to break more reliably.

DESCRIPTION OF EMBODIMENT

Figure 1:
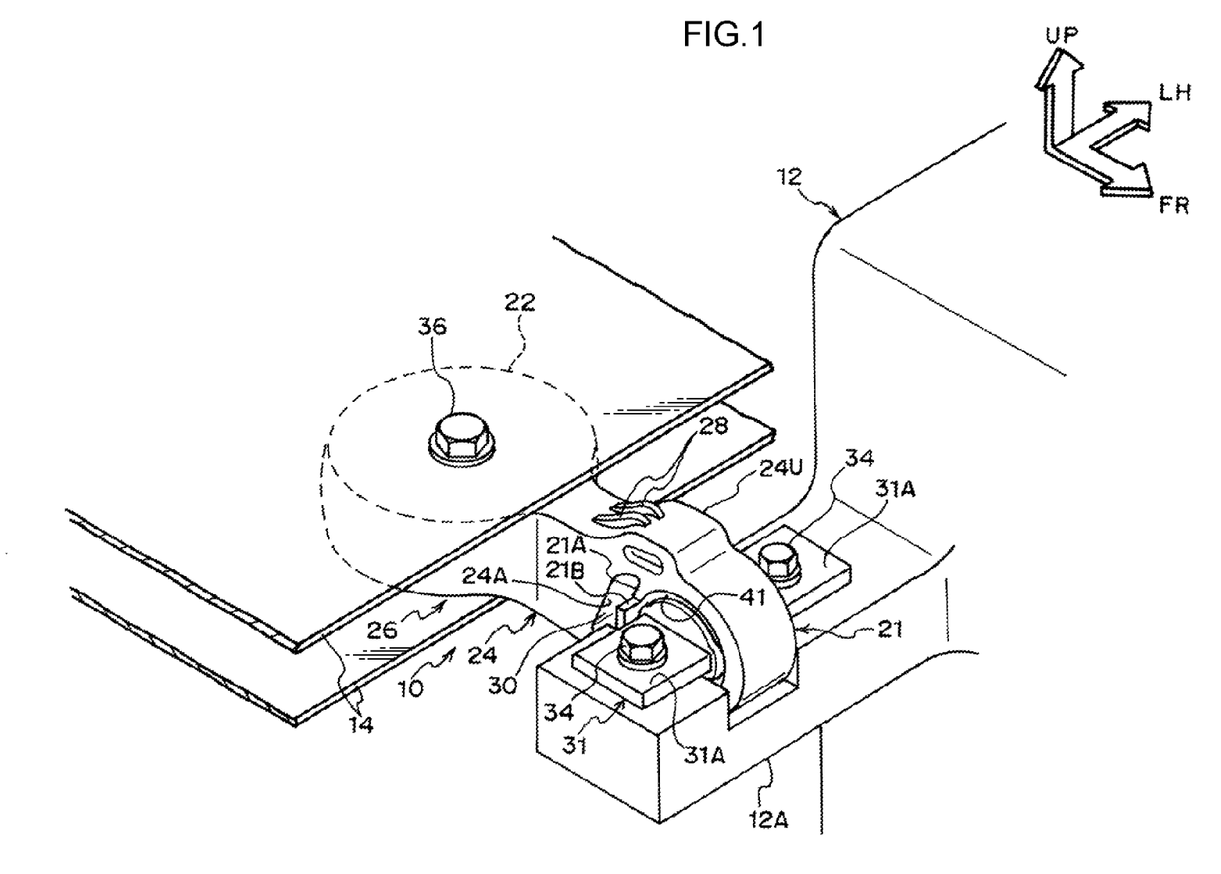
FIG. 1 is a perspective view showing a torque rod that is attached between a vehicle body and a power unit.
Figure 2:
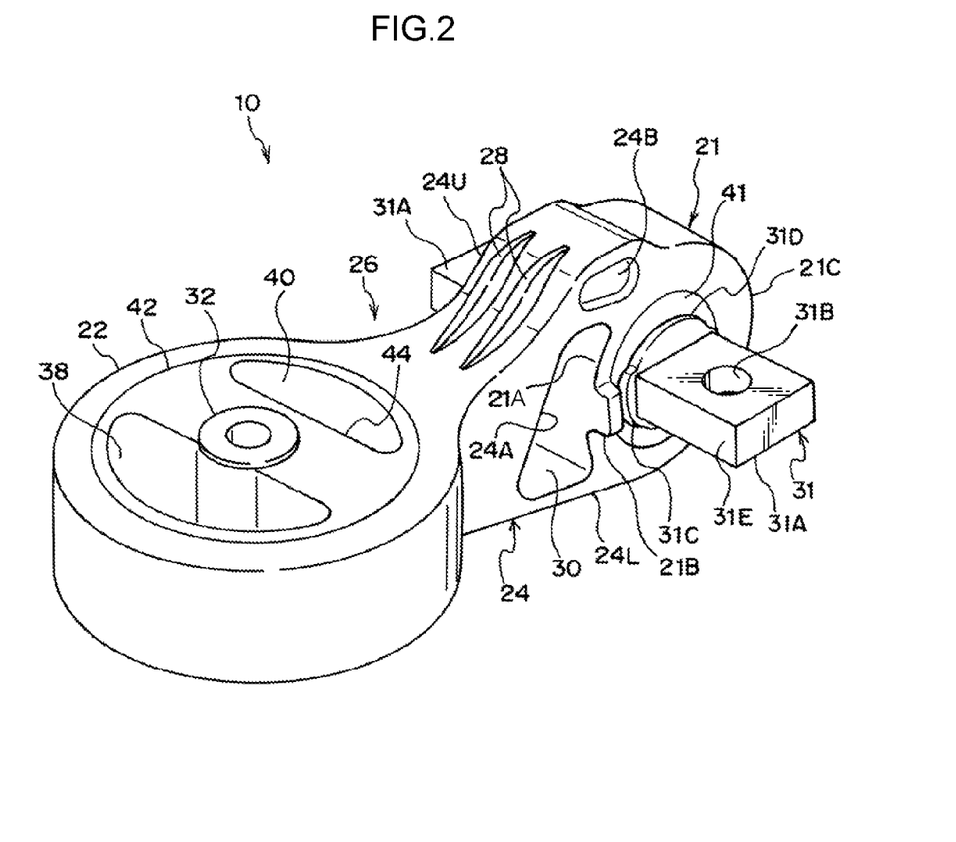
FIG. 2 is a perspective view showing the torque rod.

An embodiment of the present invention will be described below on the basis of the drawings. In FIG. 1 and FIG. 2, a torque rod 10 pertaining to the present embodiment is a type of mount that is used in a vehicle and configures an anti-vibration support mechanism of a power unit 12 with respect to a vehicle body 14, and the torque rod 10 is disposed between an end portion 12A of the power unit 12 and the vehicle body 14, for example. The torque rod 10 has a first annular portion 21, a second annular portion 22, a connecting stay portion 24, a first attachment member 31, a second attachment member 32, a first rubber elastic body 41, a second rubber elastic body 42, a thin-walled portion 21A, a projecting portion 21B, and a sloping surface 24A, and the torque rod 10 is configured to limit the power unit 12 from being displaced in a rolling direction and a vehicle body front-and-rear direction, for example, due to the torque reaction force and inertial force of the power unit 12.

The first annular portion 21 and the second annular portion 22 are both configured in substantially annular shapes, and the second annular portion 22, for example, is formed in a larger diameter than the first annular portion 21. Further, the first annular portion 21, the second annular portion 22, and the connecting stay portion 24 are integrally molded using synthetic resin, for example, and configure a rod body portion 26. In a state in which the torque rod 10 is attached to a vehicle, the axial direction of the second annular portion 22 coincides with the vehicle up-and-down direction, for example, and the axial direction of the first annular portion 21 coincides with the vehicle width direction, for example. For this reason, the axial direction of the first annular portion 21 and the axial direction of the second annular portion 22 are orthogonal to one another. The way in which the torque rod 10 is attached to the vehicle is not limited to this; for example, the torque rod 10 may also be attached in such a way that the axial direction of the second annular portion 22 coincides with the vehicle width direction and the axial direction of the first annular portion 21 coincides with the vehicle up-and-down direction.

As shown in FIG. 2, the connecting stay portion 24 extends outward in a radial direction from an outer peripheral section of the second annular portion 22 and is continuous with an outer peripheral section of the first annular portion 21. The connecting stay portion 24 has an upper fork portion 24U that is connected to an upper side of the first annular portion 21 and a lower fork portion 24L that is connected to a lower side of the first annular portion 21. The bending strength of the lower fork portion 24L is less than that of the upper fork portion 24U, and the lower fork portion 24L is thinner-walled than the upper fork portion 24U. In other words, the bending strength of the upper fork portion 24U is higher than that of the lower fork portion 24L, and the upper fork portion 24U is thicker-walled than the lower fork portion 24L.

Specifically, the thickness of the upper fork portion 24U is set considerably higher than the outer diameter of the first annular portion 21 particularly in the region where the upper fork portion 24U is continuous with the first annular portion 21. In addition to this, the upper fork portion 24U is reinforced by ribs 28. Not only is the bending strength of the upper fork portion 24U configured to be higher than that of the lower fork portion 24L, but also the compressive strength of the upper fork portion 24U when a load is input to the first attachment member 31 is configured to be higher than that of the lower fork portion 24L. In this way, a large difference in bending strength is disposed between the upper fork portion 24U and the lower fork portion 24L. Because the upper fork portion 24U is thick-walled, hollowed-out portions 24B may also be appropriately disposed in the side portions of the upper fork portion 24U in consideration of moldability and so forth.

In the connecting stay portion 24, a cavity portion 30 to which part of the first annular portion 21 is exposed is formed between the upper fork portion 24U and the lower fork portion 24L. The sloping surface 24A, whose lower side slopes toward the second annular portion 22, is formed in a region of the cavity portion 30 opposing the first annular portion 21. The up-and-down dimension of the cavity portion 30 is set to be the same as or greater than the inner diameter of the first annular portion 21, for example. This is to make it easier for the first attachment member 31 to move backward into the cavity portion 30 when the first annular portion 21 has broken starting at the thin-walled portion 21A at the time of a vehicle collision.

The thin-walled portion 21A is disposed in a region of the first annular portion 21 exposed to the cavity portion 30. The thin-walled portion 21A is a region whose thickness is set smaller than that of an ordinary portion 21C not exposed to the cavity portion 30; for example, the thin-walled portion 21A is configured in such a way that its thickness gradually becomes smaller heading toward the upper side of the cavity portion 30.

Further, the projecting portion 21B, which is formed convexly in the axial direction of the first annular portion 21, is disposed on the thin-walled portion 21A. The projecting portion 21B is disposed in a position in the thin-walled portion 21A intersecting a direction in which a load is input to the first attachment member 31. In the present embodiment, the direction in which a load is input to the first attachment member 31 is a planar direction of tabular portions 31A of the first attachment member 31. This is because, as shown in FIG. 1, the tabular portions 31A of the first attachment member 31 are fixed to the end portion 12A of the power unit 12 in a state in which the tabular portions 31A are along the vehicle front-and-rear direction, which is the direction in which a load from the power unit 12 is input.

In a case where the state of attachment of the tabular portions 31A with respect to the end portion 12A of the power unit 12 differs from the above configuration and the direction in which a load is input to the first attachment member 31 differs from the planar direction of the tabular portions 31A, the position of the projecting portion 21B is set using as a reference the direction in which a load is input to the first attachment member 31.

Figure 3:
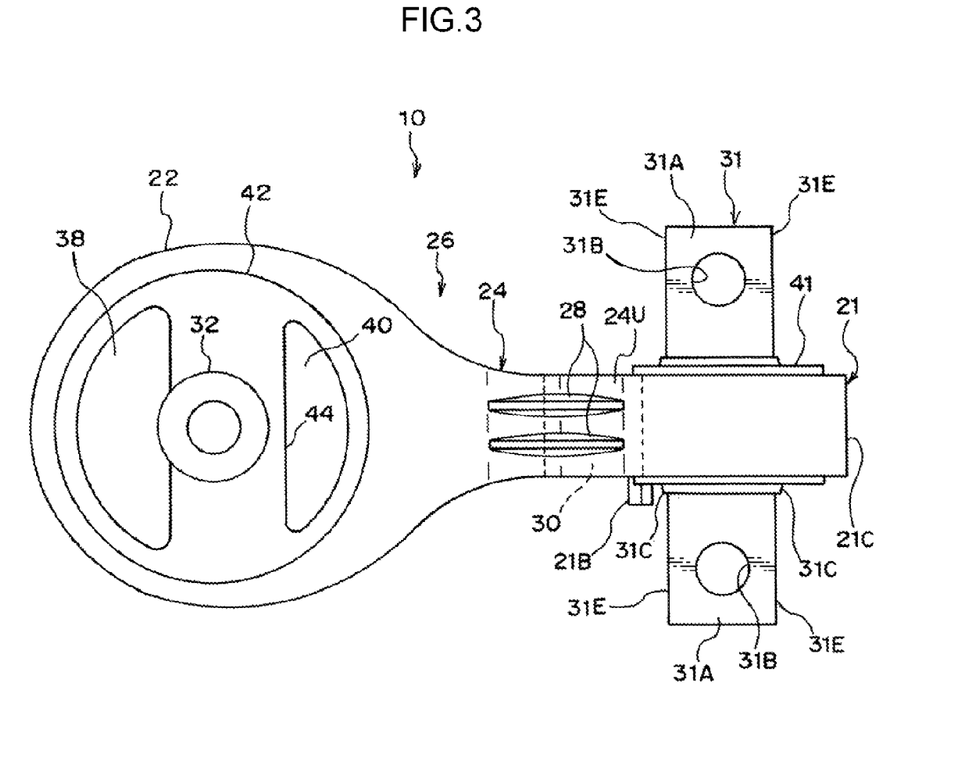
FIG. 3 is a plan view showing the torque rod as seen from an axial direction of a second annular portion.

The range of the projecting portion 21B in the circumferential direction of the first annular portion 21 is the same as the thickness of the tabular portions 31A of the first attachment member 31. How much the projecting portion 21B projects in the axial direction of the first annular portion 21 is arbitrary. As shown in FIG. 3, the projecting portion 21B is disposed only on one axial direction side of the first annular portion 21, for example, but it is not limited to this and may also be disposed on both axial direction sides.

In FIG. 1 to FIG. 4, the first attachment member 31 is a rod-like member that is made of metal, for example, is placed on an inner peripheral side of the first annular portion 21, and is connected to the power unit 12. Specifically, the first attachment member 31 is inserted through the first annular portion 21, for example, and the tabular portions 31A are disposed on both ends of the first attachment member 31 projecting on both axial direction sides of the first annular portion 21. Through holes 31B for passing bolts 34, for example, are formed in the tabular portions 31A. As shown in FIG. 1, the first attachment member 31 is fixed to the power unit 12 by passing the bolts 34 through the through holes 31B and fastening the bolts 34 to the end portion 12A of the power unit 12.

A protruding portion 31C that protrudes in such a way as to approach the projecting portion 21B is disposed in a position on the first attachment member 31 opposing the projecting portion 21B of the first annular portion 21—such as, for example, on a base portion of an end surface 31E of a tabular portion 31A. A center portion 31D of the first attachment member 31 inserted through the first annular portion 21 is configured in a cylindrical shape, for example, and the protruding portion 31C is configured to protrude further outward in the radial direction than the outer diameter of the center portion 31D.

Figure 4:
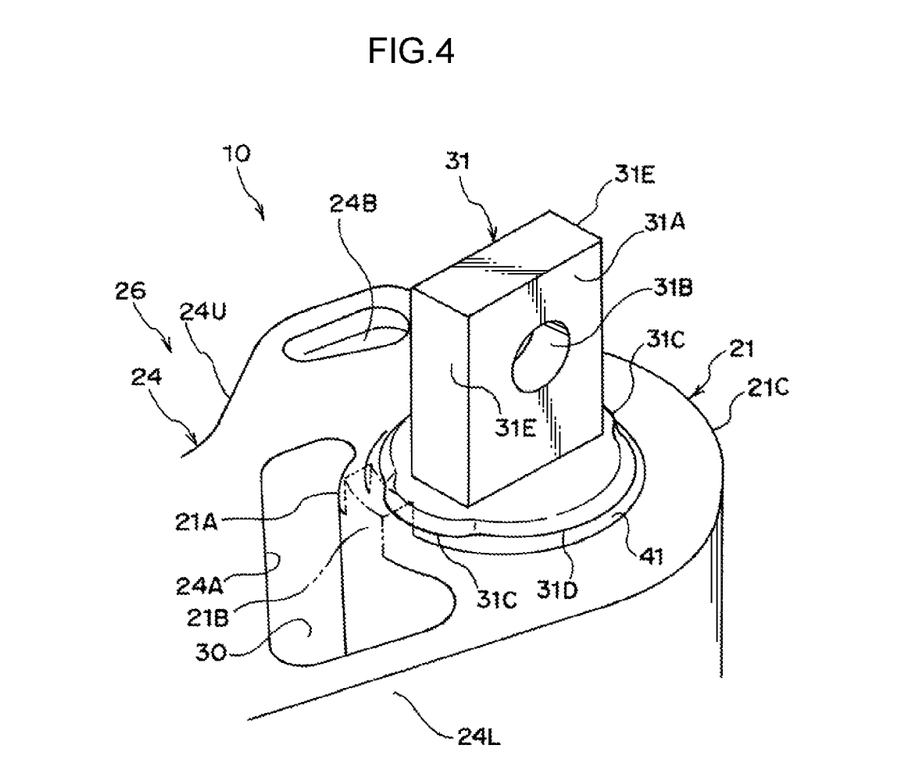
FIG. 4 is an enlarged perspective view showing a structure in the vicinity of a first annular portion in the torque rod.

Further, as shown in FIG. 4, the protruding portion 31C can be disposed not just in the position opposing the projecting portion 21B of the first annular portion 21 but also on the opposite side thereof in the radial direction of the first attachment member 31. In other words, the projecting portion 31C may be disposed on base portions of end surfaces 31E on both sides of the tabular portions 31A. This is because, by configuring the first attachment member 31 in this way, the protruding portion 31C can be made to oppose the projecting portion 21B irrespective of the front and back of the protruding portion 31C or the tops and bottoms of the tabular portions 31A when attaching the first attachment member 31 to the first annular portion 21, and workability improves.

In FIG. 2 and FIG. 3, the second attachment member 32 is a cylindrical member that is made of metal, for example, is placed on an inner peripheral side of the second annular portion 22, and is connected to the vehicle body 14 (FIG. 1). A bolt 36 (FIG. 1), for example, fastened to the vehicle body 14 is inserted through the second attachment member 32.

In FIG. 1 to FIG. 4, the first rubber elastic body 41 is disposed between the first annular portion 21 and the first attachment member 31 and elastically interconnects the first annular portion 21 and the first attachment member 31. Specifically, for example, the first rubber elastic body 41 is vulcanized and molded on the outer peripheral surface of the center portion 31D of the first attachment member 31 and is vulcanized and adhered to the inner peripheral surface of the first annular portion 21.

In FIG. 2 and FIG. 3, the second rubber elastic body 42 is disposed between the second annular portion 22 and the second attachment member 32 and elastically interconnects the second annular portion 22 and the second attachment member 32. Specifically, for example, the second rubber elastic body 42 is vulcanized and molded on the outer peripheral surface of the second attachment member 32 and is vulcanized and adhered to the inner peripheral surface of the second annular portion 22.

Hollow portions 38 and 40 are formed on both sides of the second attachment member 32 in the axial direction of the connecting stay portion 24. The hollow portions 38 and 40 penetrate the second rubber elastic body 42 along the axial direction of the second attachment member 32. A rubber connecting portion 44 is formed between the hollow portions 38 and 40. The second attachment member 32 is elastically supported in the rubber connecting portion 44 with respect to the second annular portion 22.

(Action)

The present embodiment is configured as described above, and the action thereof will be described below. In FIG. 1, the torque rod 10 pertaining to the present embodiment is attached between the end portion 12A of the power unit 12 and the vehicle body 14 and is used. According to the torque rod 10, the torque rod 10 can elastically limit the power unit 12 from being displaced in the rolling direction and the vehicle body front-and-rear direction, for example, due to the torque reaction force and inertial force of the power unit 12.

Further, in a case where the second annular portion 22 has become relatively displaced a predetermined amount or more in the axial direction of the connecting stay portion 24 with respect to the second attachment member 32, the inner wall surfaces of the hollow portions 38 and 40 come into contact with one another, or those inner wall surfaces and the second attachment member 32 come into contact with one another, whereby further relative displacement of the second annular portion 22 can be limited.

Additionally, at the time of a vehicle collision, the torque rod 10 becomes broken downward in the following way. In the torque rod 10, the thin-walled portion 21A is disposed in the region of the first annular portion 21 exposed to the cavity portion 30 between the upper fork portion 24U and the lower fork portion 24L of the connecting stay portion 24, and the projecting portion 21B formed convexly in the axial direction of the first annular portion 21 is disposed on the thin-walled portion 21A, so when, at the time of a vehicle collision, a predetermined load or greater has been input from the power unit 12 to the first attachment member 31 and that load has been further transmitted from the first attachment member 31 to the first annular portion 21, it becomes easier for stress concentration to arise in the thin-walled portion 21A of the first annular portion 21 having the projecting portion 21B.

Figure 5A:
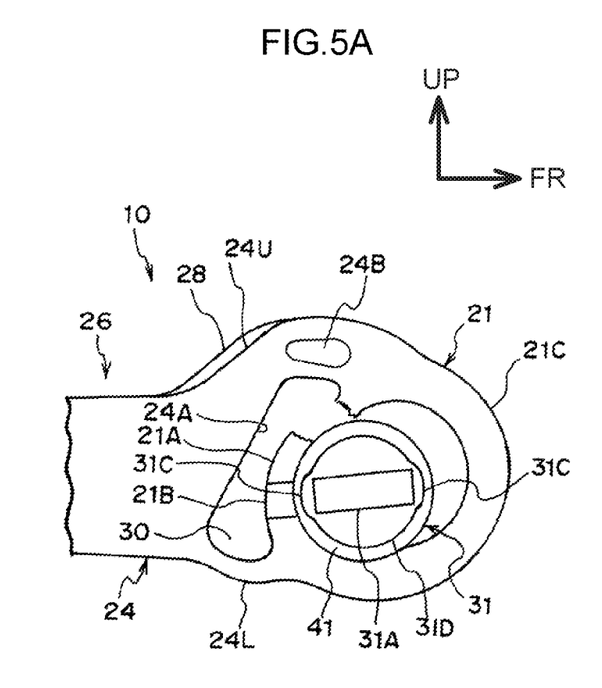
FIG. 5A is a main-portion side view showing a state in which the first annular portion has broken starting at a thin-walled portion when a predetermined load or greater has been input to a first attachment member.

Here, the projecting portion 21B is disposed in a position intersecting the planar direction of the tabular portions 31A, for example, which is the direction in which a load is input to the first attachment member 31, and the protruding portion 31C that protrudes in such a way as to approach the projecting portion 21B is disposed in the position on the first attachment member 31 opposing the projecting portion 21B, so when the predetermined load or greater is input to the first attachment member 31, the first rubber elastic body 41 elastically deforms, whereby the protruding portion 31C of the first attachment member 31 quickly contacts the projecting portion 21B of the first annular portion 21. Because of this, the load that has been input to the first attachment member 31 is quickly and concentratedly input to the projecting portion 21B, and a large stress concentration arises in the thin-walled portion 21A of the first annular portion 21A. Because of this, as shown in FIG. 5A, the first annular portion 21 can be allowed to break more reliably starting at the thin-walled portion 21A. Further, because of this, the first attachment member 31 becomes movable backward into the cavity portion 30.

In addition to this, in the present embodiment, the connecting stay portion 24 has the upper fork portion 24U that is connected to the upper side of the first annular portion 21 and the lower fork portion 24L that is connected to the lower side of the first annular portion 21, and the bending strength of the lower fork portion 24L is set relatively lower than that of the upper fork portion 24U further reinforced by the ribs 28, so the lower fork portion 24L reliably breaks when the predetermined load or greater is input to the first attachment member 31.

Figure 5B:
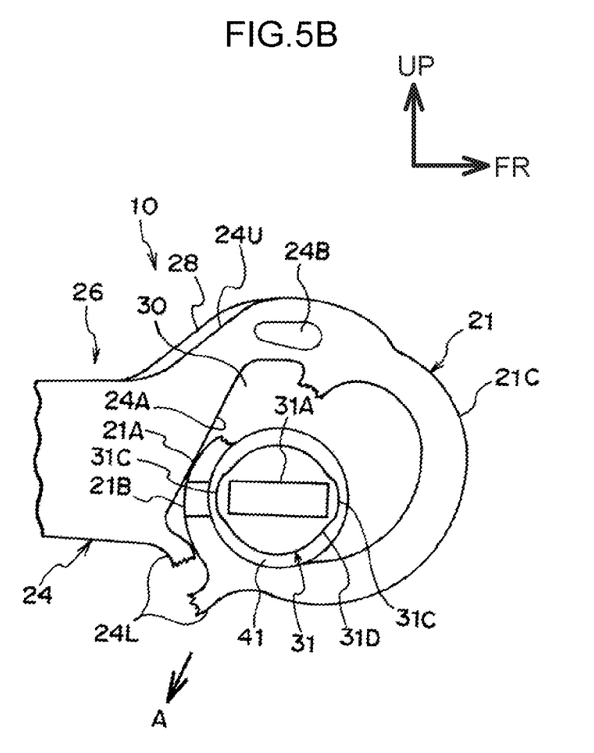
FIG. 5B is a main-portion side view showing a state in which a lower fork portion of a connecting stay portion has broken and the first attachment member has moved backward into a cavity portion, is guided on a sloping surface of the cavity portion, and is moving downward.

Moreover, as shown in FIG. 5B, the sloping surface 24A whose lower side slopes toward the second annular portion 22 is formed in the region of the cavity portion 30 opposing the first annular portion 21, so the first attachment member 31 that has moved backward into the cavity portion 30 comes into contact with the sloping surface 24A and is thereafter guided on the sloping surface 24A and moves downward toward the vehicle rear side (in the direction of arrow A). The power unit 12 (FIG. 1) is connected to the first attachment member 31, and the power unit 12 can be allowed to fall out downward more reliably as a result of the torque rod 10 breaking downward as described above and the first attachment member 31 moving downward.

In this way, in the present embodiment, by disposing the difference in bending strength between the upper fork portion 24U and the lower fork portion 24L of the connecting stay portion 24 and giving the torque rod 10 a structure that uses the thin-walled portion 21A and the projecting portion 21B disposed on the first annular portion 21 to allow stress concentration to arise in the first annular portion 21, the load (breaking load) at which the torque rod 10 breaks at the time of a vehicle collision can be easily set.

(Other Embodiments)

The first annular portion 21 and the second annular portion 22 are both configured in substantially annular shapes, but these may also be ring-shaped portions other than circular used in the field of torque rods.

Further, the upper fork portion 24U of the connecting stay portion 24 is reinforced by the ribs 28, but it is not limited to this, and the ribs 28 do not have to be disposed provided that the bending strength of the lower fork portion 24L can be set to relatively sufficiently low by, for example, making the upper fork portion 24U sufficiently thicker than the lower fork portion 24L. Moreover, the connecting stay portion 24 is configured as a bifurcated structure having the upper fork portion 24U and the lower fork portion 24L, but it is not limited to this and may also be a structure having three or more forks provided that the same action and effects as those of the present embodiment are obtained.

Further, the projecting portion 21B of the thin-walled portion 21A of the first annular portion 21 is disposed in the position intersecting the direction in which a load is input to the first attachment member 31, but the projecting portion 21B may also be disposed in a position on the thin-walled portion 21A not intersecting the direction in which a load is input.

The protruding portion 31C is disposed in the position on the first attachment member 31 opposing the projecting portion 21B, but the first attachment member 31 is not limited to this and may also be configured to not have the protruding portion 31C.

REFERENCE SIGNS LIST

10 Torque Rod
12 Power Unit
14 Vehicle Body
21 First Annular Portion
21A Thin-walled Portion
21B Projecting Portion
22 Second Annular Portion
24A Sloping Surface
24L Lower fork Portion
24U Upper fork Portion
24 Connecting Stay Portion
28 Ribs
30 Cavity Portion
31 First Attachment Member
31C Protruding Portion
32 Second Attachment Member
41 First Rubber Elastic Body
42 Second Rubber Elastic Body

The invention claimed is:

1. A torque rod comprising:
   a first annular portion;
   a second annular portion;
   a connecting stay portion that extends outward in a radial direction from an outer peripheral section of the second annular portion and is continuous with an outer peripheral section of the first annular portion, the connecting stay portion having an upper fork portion that is connected to an upper side of the first annular portion and a lower fork portion that is connected to a lower side of the first annular portion and whose bending strength is less than that of the upper fork portion, with a cavity portion to which part of the first annular portion is exposed being formed between the upper fork portion and the lower fork portion;
   a first attachment member that is placed on an inner peripheral side of the first annular portion and is connected to a power unit;
   a second attachment member that is placed on an inner peripheral side of the second annular portion and is connected to a vehicle body;
   a first rubber elastic body that is disposed between the first annular portion and the first attachment member and elastically interconnects the first annular portion and the first attachment member;
   a second rubber elastic body that is disposed between the second annular portion and the second attachment member and elastically interconnects the second annular portion and the second attachment member;
   a thin-walled portion that is disposed in a region of the first annular portion exposed to the cavity portion;
   a projecting portion that is disposed on the thin-walled portion and is formed convexly in an axial direction of the first annular portion; and
   a sloping surface that is formed in a region of the cavity portion opposing the first annular portion and whose lower side slopes toward the second annular portion.

2. The torque rod according to claim 1, wherein the upper fork portion is reinforced by ribs.

3. The torque rod according to claim 2, wherein the projecting portion is disposed in a position intersecting a direction in which a load is input to the first attachment member.

4. The torque rod according to claim 3, wherein a protruding portion that protrudes in such a way as to approach the projecting portion is disposed in a position on the first attachment member opposing the projecting portion.

5. The torque rod according to claim 1, wherein the projecting portion is disposed in a position intersecting a direction in which a load is input to the first attachment member.

6. The torque rod according to claim 5, wherein a protruding portion that protrudes in such a way as to approach the projecting portion is disposed in a position on the first attachment member opposing the projecting portion.

* * * * *